United States Patent [19]

Pemberton et al.

[11] 4,413,738
[45] Nov. 8, 1983

[54] APPARATUS AND METHOD FOR CONTROLLING THE INSPECTION OF FINISHED PRODUCTS

[75] Inventors: Ernest H. Pemberton, Toledo, Ohio; Darius O. Riggs, Ottawa Lake, Mich.; Douglas J. Mansor; James R. Sager, both of Sylvania, Ohio; John W. Juvinall, Ottawa Lake, Mich.

[73] Assignee: Owens-Illinois, Inc., Toledo, Ohio

[21] Appl. No.: 242,808

[22] Filed: Mar. 11, 1981

[51] Int. Cl.³ .......................... B07C 5/34; G06F 15/46
[52] U.S. Cl. ..................................... 209/523; 209/583; 364/473
[58] Field of Search ............... 209/524, 525, 526, 528, 209/531, 583, 586–588, 522, 523; 250/223 B; 364/473, 476, 552, 556

[56] References Cited

U.S. PATENT DOCUMENTS 3,708,064  1/1973  Schepler et al. ................. 209/551 X
3,757,943  9/1973  Chae et al. ........................ 209/551
3,923,158  12/1975  Fornaa ......................... 250/223 B X Primary Examiner—Robert B. Reeves
Assistant Examiner—Donald Hajec
Attorney, Agent, or Firm—Gerald T. Welch; Myron E. Click

[57] ABSTRACT

A finished product controller is disclosed for monitoring the performance of a glassware production line and the bottle inspection equipment operating thereon. Bottles are formed in molds which impress an identifying code unique to each mold in each formed bottle. Bottles leaving the forming machine are fed to one of several inspection loops. A primary inspection loop inlcudes apparatus for inspecting the bottles fed to it for defects and apparatus for reading the identifying code on those bottles. One or more secondary inspection loops are provided for inspecting the rest of the bottles for defects only. A computer correlates the detected defects in the bottles passing through the primary inspection loop to the defective mold which produced them and acquires defect data on the secondary loops. A cavity reject ratio is calculated for each defect and compared to a predetermined value to alert a forming operator to a defective cavity. The reject ratios are totaled for each defect and the ratio for each defect from each loop is compared to the corresponding ratio from the other loops to identify malfunctioning inspection devices. Located downstream of all of the inspection loops is an apparatus for reading the identifying codes of all the inspected bottles. In the alternative, the downstream reader can sense the presence of bottles formed in a particular mold which has been determined in the primary inspection loop to be defective, and the computer can alert maintenance personnel to locate and correct the defective inspection equipment in one of the secondary inspection loops.

18 Claims, 2 Drawing Figures

APPARATUS AND METHOD FOR CONTROLLING THE INSPECTION OF FINISHED PRODUCTS

BACKGROUND OF THE INVENTION

1. Field of the Invention

The present invention relates in general to control systems for glassware forming machines and in particular to a finished product controller apparatus and method for monitoring and recording the performance of a glassware production line and the bottle inspection equipment operating thereon.

2. Description of the Prior Art

As is known in the art of manufacturing glass containers, an individual section machine is used to form containers in production cavities by sets of iron molds. It has been found that when a particular cavitiy is producing a defective bottle, it would be desirable to identify the malfunctioning molds and select out all of those containers formed therein. To this end, many cavity identification devices and handling systems are known in the glassware forming art.

For example, U.S. Pat. Nos. 4,175,236 and 4,230,266 issued to J. W. Juvinall both relate to a method and apparatus of cavity identification of the molds producing particular containers utilizing a concentric ring code molded in the bottom of the container. The code is read by measuring the variation of intensity of light reflected from the bottom of the container to a particular point. U.S. Pat. No. 4,230,219 issued to Pezzin et al. discloses a handling system for a cavity identification device wherein bottles are removed from a linear conveyor by a rotating starwheel so as to space the bottles apart and guide them sequentially over a cavity identification reader.

U.S. Pat. No. 3,923,158 issued to Fornaa discloses a bottle making machine with a plurality of inspection stations which provide information for rejecting defective bottles. Bottles to be inspected are conveyed single file past a series of inspection stations including a mold number reading device. The output from the inspection units and the mold number detector are combined to generate information on the type of fault as well as the mold number. This information can be processed and forwarded to the production personnel for information and possible corrective measures, as well as for display on a cathode ray tube device.

SUMMARY OF THE INVENTION

The present invention relates to a finished product controller apparatus and method for monitoring and recording the performance for a glassware production line and the bottle inspection equipment operating thereon. Bottles leaving a lehr are fed to one of several parallel inspection loops. Each inspection loop includes a number of inspection sensors located thereon to detect defective bottles. In the preferred embodiment of the invention, each inspection loop includes an impact simulator and a multistation defect inspection device, both of which are well known in the art. A primary one of the inspection loops further includes a cavity identification device for determining which of a plurality of molds produced a particular container. A similar cavity identification device is located downstream of a point at which all of the outputs of all the inspection loops are combined.

The finished product controller is responsive to the cavity and defect information generated by the various inspection devices. The controller correlates the detected defects to the cavities producing them on a sampled basis. Cavity information obtained from the cavity identification device in the primary inspection loop is used to generate a percentage reject per cavity per defect in the form of a cavity reject ratio. The cavity reject ratio obtained from the primary inspection loop is considered valid for all of the inspection loops if the distribution of bottles into those loops is random. If the cavity reject ratio for a particular cavity exceeds a predetermined limit, the controller can notify the forming operator to correct the defective cavity. The controller will also total the cavity reject ratios for each type of defect for each loop and compare these totals between the inspection loops to locate defective inspection equipment. Alternatively, the controller will compare the cavity reject ratio to the data generated by the downstream cavity identification device. If the downstream cavity identification device senses the presence of bottles formed in a particular cavity which has been determined by the primary inspection loop to be defective, the controller can alert maintenance personnel to locate and correct the defective inspection equipment in one of the secondary inspection loops.

It is an object of the present invention to provide a controller which increases the quality of the finished product from a glassware production line.

It is another object of the present invention to provide a controller for a glassware production line which decreases the complexity and cost of defect detection.

It is a further object of the present invention to provide a method and apparatus for controlling the inspection of finished products which increases the performance of inspection equipment operating on parallel inspection loops.

BRIEF DESCRIPTION OF THE DRAWINGS

Other objects and advantages of the present invention will become apparent to those skilled in the art from the following detailed description of the preferred embodiment of the invention when read in light of the accompanying drawings, wherein.

DETAILED DESCRIPTION OF THE PREFERRED EMBODIMENT

Figure 1:
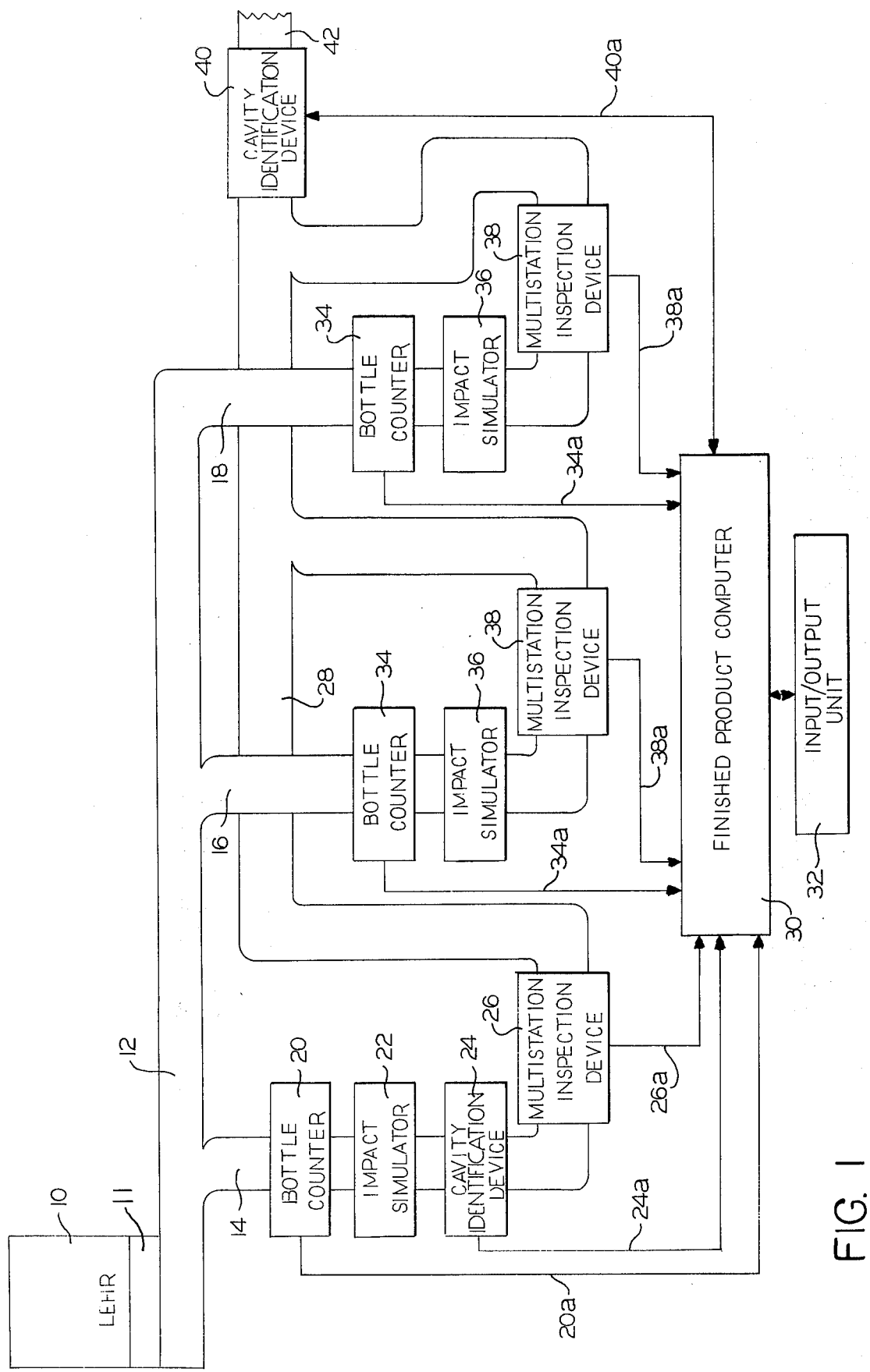
FIG. 1 is a schematic view illustrating the parallel inspection lines and computer of a finished product controller in accordance with the present invention.

Referring now to the drawings, there is illustrated in FIG. 1 a schematic view of a finished product controller in accordance with the present invention. Articles such as glass bottles or containers are formed in the production cavities of the well known individual section glassware forming machine (not shown). The molds of each cavity impress a unique identifying code into the bottom of every bottle so as to permit a cavity identifying device to read the imprinted code and determine the mold of origin of any particular container, as described above.

The bottles are then fed to a lehr 10 in a predetermined sequence from the cavities. A typical lehr 10 is divided into a plurality of temperature zones for heating and cooling the formed bottles to give them added strength and desirable finished characteristics. When the bottles eventually exit the lehr 10, they have sufficiently cooled in temperature to permit inspection and packing operations to begin.

Bottles are removed from the lehr 10 in a random fashion by a lehr unloader 11 and are placed on a serving conveyor means 12 for moving the bottles sequentially to an inspection area. The conveyor 12, as well as the lehr unloader 11 are well known in the art. The bottles are randomly fed to either a primary inspection loop 14 or any of several parallel secondary inspection loops 16 or 18. Although only two secondary inspection loops 16 and 18 are illustrated in FIG. 1, it will be appreciated that any number of secondary loops can be added in parallel to increase the capacity of the finished product controller.

Bottles entering the primary inspection loop 14 first pass by a bottle counter 20. The bottle counter 20 can be a simple photoelectric eye which is used to generate a signal whenever a bottle passes by the counter 20 on the primary inspection loop 14. The bottles are then feed to an impact simulator device 22. The impact simulator 22 is an inspection device for testing glass containers for structural defects, principally in the side wall surfaces thereof, by applying pressure to a portion of the circumference of the side walls of the bottle. The impact simulator 22 is described in detail in U.S. Pat. No. 3,991,608 issued to McGuire et al.

The bottles not rejected by the device 22 are next fed to a means for reading the imprinted cavity identification code on the bottom of the bottles. Typical cavity identification systems are disclosed in U.S. Pat. Nos. 4,175,236; 4,230,219; and 4,230,266. The cavity identification device 24, as described above, can determine the mold of origin of any particular container. Finally, the bottles are fed to a multistation inspection device 26. Therein, the bottle is inspected and will be rejected for a number of defects, such as inner and outer diameter, variations in height, variations in the level of finish around the periphery thereof, commonly known as warp and dip and cocked finish, and vertical checks and horizontal checks in the finish. The multistation inspection device 26 is more fully described in U.S. Pat. Nos. 3,313,409 to J. R. Johnson and 3,757,940 to D. A. Damm. Following the multistation inspection device 26, the remaining bottles are fed to an upper manifold conveyor 28 for removal from the inspection area.

The bottle counter 20 generates a signal over a line 20a each time a bottle enters the primary inspection loop 14. The signals on line 20a are fed to a finished product computer 30. Similarly, the data from the cavity identification device 24, representing the mold of origin of each of the bottles to reach it, is fed over a line 24a to the computer 30. Since the impact simulator 22 has no built-in mechanism for counting rejected bottles, the computer 30 can determine the number of bottles rejected by the impact simulator 22 by subtracting the number of bottles to reach the cavity identification device 24 from the number of bottles sensed by the bottle counter 20. The multistation inspection device 26 generates signals over a line 26a to the computer 30 which signals represent the type and number of defects detected therein. A conventional input/output unit 32 is provided to permit an operator to program and receive data from the computer 30.

The bottles which do not enter the primary inspection loop 14 are fed along the conveyor 12 to either of the secondary inspection loops 16 or 18. Because each of the secondary inspection loops is identical, only the first secondary inspection loop 16 will be described in detail. Like reference numerals, however, will be used to denote the corresponding parts on the other secondary inspection loop 18. As the bottles enter the secondary inspection loop 16, they are counted by a bottle counter 34 which is similar in construction to the primary inspection loop bottle counter 20. The bottle counter 34 generates a signal over a line 34a whenever a bottle enters the secondary inspection loop 16. The bottles are then fed to a impact simulator 36 which inspects them for side wall strength and rejects the defective bottles. Finally, the bottles remaining are fed to a multistation inspection device 38 which inspects the bottles for several types of defects. The multistation section device 38 generates a signal over a line 38a to the computer 30 representing the type and number of detected defects in bottles rejected by it. The bottles which were not rejected are fed from the multistation device 38 to the upper manifold conveyor 28 for removal from the finished product controller. It will be appreciated that but for the absence of the cavity identification device 24, the secondary inspection loop 16 is identical to the primary inspection loop 14.

Downstream of all of the inspection loops is located a second cavity identification device 40. The downstream cavity identification device 40 reads the impressed mold code from the bottom of every bottle which has not been rejected by the various inspection devices and thereby has been placed on the upper manifold conveyor 28. The cavity identification device 40 can be utilized to identify bottles which are to be rejected for mold related defects. The computer 30 generates a signal over the line 40a to identify the defective mold to the device 40. Bottles which are not rejected are fed to a select-pack conveyor 42. The computer 30 can store the on and off times for each cavity reject signal sent to the cavity identification device.

Figure 2:
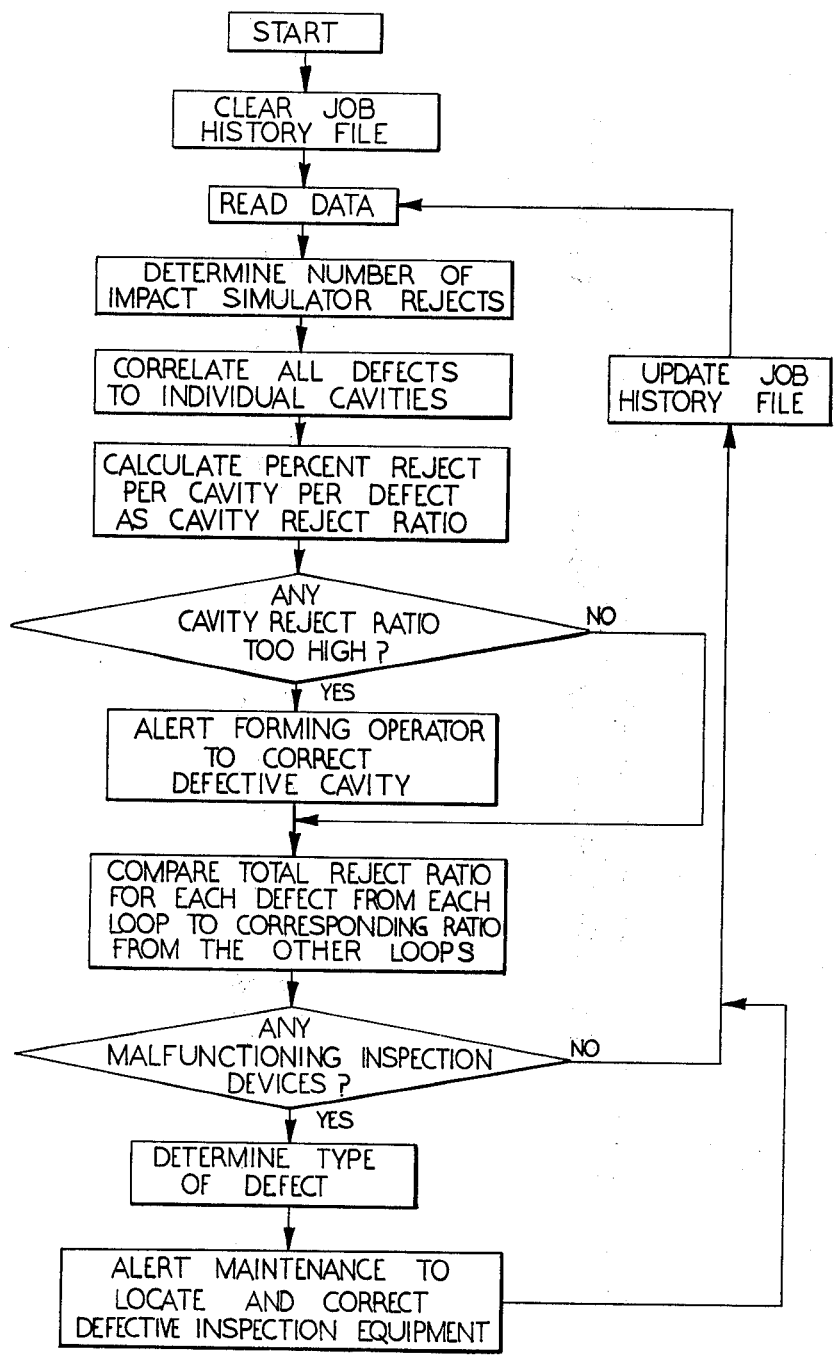
FIG. 2 is a flow chart of the main program of the computer of FIG. 1.

Referring now to FIG. 2, there is shown a flow diagram for the computer 30 of the finished product controller. The program is entered at a "START" point. The program immediately enters a processing instruction "CLEAR JOB HISTORY FILE". The program then enters a "READ DATA" instruction. The computer 30 interrogates each inspection device on each of the inspection loops and stores the data obtained therefrom. The program then enters a processing instruction "DETERMINE NUMBER OF IMPACT SIMULATOR REJECTS". The number of bottles rejected by the impact simulator 22 in the primary inspection loop 14 can be determined by subtracting the number of bottles to reach the cavity identification device 24 from the number of bottles sensed by the bottle counter 20.

The program next enters a processing instruction "CORRELATE ALL DEFECTS TO INDIVIDUAL CAVITIES". The upstream cavity identification device 24 receives a virtually continuous flow of bottles since the impact simulator 22 operates quickly enough so that gaps created by the bottles breaking in it are quickly filled up. Accordingly, the multistation inspection device 26 also receives a virtually continuous flow of bottles which are each inspected at the several inspection stations. By locating the upstream cavity identification device 24 close to the multistation inspection device 26, the computer 30 can correlate the defects detected by the multistation inspection device 26 to the particular cavity producing them.

As disclosed in U.S. Pat. No. 3,313,409, the multistation inspection devices 26 and 38, can include a reject station for removing defective bottles from the inspection lines 14, 16 and 18. However, as is well known, a separate reject station can be located downstream of each inspect device as is disclosed in U.S. Pat. No. 3,757,940. This patent also discloses a system for generating the defect signals on the lines 26a and 38a to the computer 30. Since the cavity identification device 24 and the multistation inspection device 26 are inspecting a continuous line of bottles, the signals from these devices can be correlated with the associated bottles by generating a clock pulse at a frequency proportional to the speed of the conveyor moving the bottles. Thus, the position of each bottle on the inspection loop can be determined through the output of the multistation inspection device. A system for generating such a clock pulse is disclosed in U.S. Pat. No. 3,757,940.

The program next enters another processing instruction "CALCULATE PERCENT REJECT PER CAVITY PER DEFECT AS CAVITY REJECT RATIO". Utilizing the cavity and defect information obtained from the various inspection devices on the primary inspection loop 14, the computer 30 can calculate percentages relating to the type and frequency of defects found in bottles formed in each particular cavity. This cavity reject ratio, therefore, is a statistical sampling relating to the mold of origin of the bottles in the primary inspection loop 14 which can be applied to all of the bottles being inspected. The cavity reject ratio based on the sampling of the bottles will be valid for the entire line of bottles to be inspected so long as the distribution of bottles into the primary inspection line 14 is random. Randomness is assured to an acceptable degree because the bottles are randomly removed from the lehr 10 by the lehr unloader 11 and randomly selected from the conveyor 12 to either the primary inspection loop 14 or one of the secondary loops lines 16 or 18.

Having calculated the cavity reject ratio, the computer 30 enters a decision point "ANY CAVITY REJECT RATIO TOO HIGH?". The computer 30 will compare the calculated reject ratio with a predetermined acceptable tolerance level. If the cavity reject ratio is less than the predetermined level, the program branches at "NO" to a processing instruction "COMPARE TOTAL REJECT RATIO FOR EACH DEFECT FROM EACH LOOP TO CORRESPONDING RATIO FROM THE OTHER LOOPS". If the cavity reject ratio exceeds the tolerance level, the program branches at "YES" to a processing instruction "ALERT FORMING OPERATOR TO CORRECT DEFECTIVE CAVITY". The computer 30 will generate appropriate signals to the input/output unit 32 to inform the forming operator of the identity of the malfunctioning mold and type of defect detected. In this manner, the finished product controller monitors and records the preformance of the production line equipment.

The program next enters the processing instruction "COMPARE TOTAL REJECT RATIO FROM EACH LOOP TO CORRESPONDING RATIO FROM THE OTHER LOOPS", wherein the computer checks to see if any reject ratio total for all molds for a defect differs from loop to loop. The program then enters a decision point "ANY MALFUNCTIONING INSPECTION DEVICES?". If the computer determines that the total reject ratio for a particular defect from one loop differs by more than a predetermined amount from the total reject ratios for the same defect in the other loops, then one of the various inspection devices in the one inspection loop is malfunctioning by either failing to reject bottles which are probably defective or falsely rejecting commerically acceptable ware. The program branches at "YES" to a processing instruction "DETERMINE TYPE OF DEFECT" to narrow the search for the defective inspection equipment.

The program next enters another processing instruction "ALERT MAINTENANCE TO LOCATE AND CORRECT DEFECTIVE INSPECTION EQUIPMENT". The computer 30 generates appropriate signals to the input/output unit 32 informing maintenance personnel that one of the particular types of inspection equipment is not operating properly. The program then returns to the processing instruction "UPDATE JOB HISTORY FILE". If, at the decision point, "ANY MALFUNCTIONING INSPECTION DEVICES?", no inspection devices have been determined to be malfunctioning, the program would branch at "NO" directly to the processing instruction "UPDATE JOB HISTORY FILE".

The computer 30 can be an LSI-11 computer manufactured by Digital Equipment Corporation of Maynard, Mass. or any of a number of commercially available minicomputers or mircocomputers. Furthermore, the computer 30 could be implemented as a discrete component, hard wired circuit utilizing counters to collect the defect information. For example, an up/down counter can have an up count input connected to the line 20a and a down count input connected to the line 24a to generate a count total representing the number of bottles rejected by the impact simulator 22. A separate counter for each cavity and each type of defect can be enabled from the line 24a and have a count input connected to the line 26a to count each reject per cavity per defect. The output of each counter can be compared against a predetermined stored count total to generate a signal to the maintenance personnel. A cyclic reset signal can be generated to clear the counters after a predetermined number of bottles have been inspected such that the inspection is on a sampled basis.

As an alternative mode of operation, the computer 30 can check to see if any bottles formed in the molds which have been determined to be defective are sensed at the downstream cavity identification device 40 in order to identify a malfunctioning inspection device in one of the secondary loops. In place of the processing instruction "COMPARE TOTAL REJECT RATIO FOR EACH DEFECT FROM EACH LOOP TO CORRESPONDING RATIO FROM THE OTHER LOOPS", the program could enter a processing instruction "COMPARE CAVITY REJECT RATIO TO DOWNSTREAM IDENTIFICATION DEVICE DATA" wherein the computer checks to see if any bottles formed in molds which have been determined to be defective are sensed at the downstream cavity identification device 40. The program then enters the decision point "ANY MALFUNCTIONING INSPECTION DEVICES?". If the downstream cavity identification device 40 identifies a particular bottle as having been formed in a mold which, according to the reject ratio, has been determined to be malfunctioning, then one of the various inspection devices in one of the secondary inspection loops 16 or 18 is malfunctioning by either failing to reject bottles which are probably defective or falsely rejecting commercially acceptable ware.

In accordance with the provisions of the patent statutes, the principal and mode of operation of the invention has been explained in its preferred embodiment. However, it must be understood that the invention may be practiced otherwise than as specifically illustrated and described without departing from its spirit or scope.

What is claimed is:

1. In a system for inspecting containers, each container having a code thereon for identifying its source from among a plurality of sources for the containers, the system including a primary inspection loop and a secondary inspection loop each receiving a portion of the containers, first means for inspecting containers for defects in the primary loop, second means for inspecting the containers for defects in the secondary loop, and means in the primary inspection loop for identifying the source of each container in response to the code thereon, an apparatus for acquiring defect information comprising:

acquisition means responsive to the first inspection means and the identification means for correlating detected defects in the containers inspected in the primary inspection loop to the source producing them, and responsive to the second inspection means for acquiring defect information on the containers inspected in the secondary inspection loop;

means for counting the containers entering the primary and secondary inspection loops and wherein said acquisition means is responsive to said counting means; and an impact simulator means in the primary inspection loop between said container counting means and the first identification means and wherein said acquisition means subtracts the number of containers viewed by the identification means from the number of containers counted by said means for counting containers in the primary inspection loop to determine the number of containers rejected by said impact simulator means.

2. In a system for inspecting containers, each container having a code thereon for identifying its source from among a plurality of sources for the containers, the system including a primary inspection loop and a secondary inspection loop each receiving a portion of the containers, first means for inspecting containers for defects in the primary loop, second means for inspecting the containers for defects in the secondary loop, and means in the primary inspection loop for identifying the source of each container in response to the code thereon, an apparatus for acquiring defect information comprising:

aquisition means responsive to the first inspection means and the identification means for correlating detected defects in the containers inspected in the primary inspection loop to the source producing them, and responsive to the second inspection means for acquiring defect information on the containers inspected in the secondary inspection loop; and, means at the outputs of the primary and secondary inspection loops responsive to the codes for identifying the source of each container and wherein said acquisition means is responsive to said output identification means for detecting a malfunction in the first and second inspection means.

3. In a glassware production line including a forming machine wherein bottles are formed in molds which apply an identifying code unique to each mold to every formed bottle and means for inspecting the bottles for defects, a finished product controller for monitoring the performance of the glassware forming machine and bottle inspection means, comprising:

a primary inspection loop including first means for inspecting a portion of the bottles for defects and first means for reading the mold identifying code on those bottles;

means responsive to said first means for inspecting and said first means for reading for correlating the detected defects in said primary inspection line bottles to the mold producing them;

a secondary inspection loop including second means for inspecting others of the bottles for defects;

a second means for reading the mold identifying codes on all the bottles received from said primary and secondary inspection loops; and means responsive to said means for correlating, said second means for inspecting and said second means for reading for determining if bottles formed in defective molds are being identified by said second means for reading.

4. A controller according to claim 3 wherein said primary and secondary inspection loops each include a conveyor means for randomly receiving and moving the bottles sequentially through said first and second means for inspecting respectively.

5. A controller according to claim 3 wherein said correlating means and said determining means are included in a digital computer.

6. A controller according to claim 3 wherein said first and second means for reading include cavity identification devices.

7. A controller according to claim 3 wherein said first and second means fo inspecting include multistation inspection devices.

8. An apparatus for acquiring defect information from the inspection of articles from a plurality of sources, each article carrying an identification of its associated source, comprising:

a primary inspection loop and a secondary inspection loop each randomly receiving a portion of the articles from the plurality of sources;

a first identification means responsive to the identification on the articles in said primary inspection loop for generating a signal representing the source of each of the articles;

a first inspection means for detecting defects in the articles in said primary inspection loop and generating a signal representing said defects;

a second inspection means for detecting defects in the articles in said secondary inspection loop and generating a signal representing said defects; and means responsive to said first identification means signals and said first and second inspection means signals for acquiring defect information.

9. An apparatus according to claim 8 including first and second counting means for generating signals representing the number of articles entering said primary and secondary inspection loops respectively, and wherein said means for acquiring defect information is responsive to said first and second counting means signals.

10. An apparatus according to claim 8 including counting means for generating a signal representing the number of articles entering said primary inspection loop, third inspection means in said primary inspection loop between said counting means and said first identification means for rejecting articles having a predetermined defect, and wherein said means for acquiring defect information is responsive to said counting means signal and the number of articles for which said first identification means generates a signal representing the source of each of the articles for determining the number of articles rejected by said third inspection means.

11. In a system for inspecting containers, each container having a code thereon for identifying its source from among a plurality of sources for the containers, the system including a primary inspection loop and a secondary inspection loop each receiving a portion of the containers, first means for inspecting containers for defects in the primary loop, second means for inspecting the containers for defects in the secondary loop, and means in the primary inspection loop for identifying the source of each container in response to the code thereon, an apparatus for acquiring defect information comprising:

means responsive to the first inspection means and the identification means for correlating detected defects in the containers inspected in the primary inspection loop to the source producing them; and means responsive to the second inspection means and said correlation means for determining if containers formed by defective sources are being identified by the second inspection means.

12. An apparatus according to claim 11 including first and second counting means for generating signals representing the number of containers entering the primary and secondary inspection loops respectively, and wherein said means for determining is responsive to said first and second counting means signals.

13. An apparatus according to claim 12 including first and second impact simulator means in the primary and secondary inspection loops respectively, said first impact simulator means being positioned upstream from the identification means and wherein said means for determining is responsive to said first counting means signals and the number of containers for which said identification means generates a signal representing the source of each of the containers for determining the number of containers rejected by said first impact simulator means.

14. An apparatus according to claim 11 including means responsive to said means for determining for indicating that containers formed by a defective source are being detected by the second inspection means.

15. An apparatus according to claim 11 including means responsive to correlation means for comparing the number of containers per source per defect with a predetermined value to generate an indication when said number exceeds said predetermined value.

16. In a glassware production line including a forming machine wherein bottles are formed in molds which apply an identifying code unique to each mold to every formed bottle and means for inspecting the bottles for defects, a method of monitoring and recording the performance of the glassware production line comprising the steps of:

(a) randomly selecting and inspecting a first portion of the bottles to detect defects;

(b) reading the identifying code on the bottles in said first portion;

(c) correlating the defects detected in the bottles in said first portion to the defective mold producing them;

(d) randomly selecting and inspecting a second portion of the bottles to detect defects; and (e) determining if any bottles formed in defective molds are not being detected during step d.

17. A method according to claim 16 including a step of counting the number of defective bottles produced by each of the molds for each of the defects.

18. A method according to claim 17 including a step of comparing the number of bottles per mold per defect with a predetermined value for each of the defects and generating an indication when the number exceeds the predetermined value.

* * * * *